United States Patent [19]

Butts

[11] Patent Number: 4,858,364
[45] Date of Patent: Aug. 22, 1989

[54] BODY HARNESS FOR SUPPORTING A FISHING ROD

[76] Inventor: Brian B. Butts, R.R. 7, Box 109, Rome, N.Y. 13440

[21] Appl. No.: 230,895

[22] Filed: Aug. 11, 1988

[51] Int. Cl.$^4$ .............................................. A01K 97/10
[52] U.S. Cl. ..................... 43/21.2; 224/200; 224/922
[58] Field of Search ................. 43/21.2; 224/251, 242, 224/197, 200, 226, 224

[56] References Cited

U.S. PATENT DOCUMENTS

| | | | |
|---|---|---|---|
| D. 187,651 | 4/1960 | Hiering | 43/21.2 |
| D. 193,166 | 7/1962 | Hengst | 43/21.2 |
| 2,139,188 | 12/1938 | Haislip | 224/922 |
| 2,658,650 | 11/1953 | Jasper | 224/922 |
| 2,995,855 | 8/1961 | Bell | 43/21.2 |
| 3,009,612 | 11/1961 | Fischett | 224/922 |
| 3,885,721 | 5/1975 | Vanus | 224/922 |
| 4,081,115 | 3/1978 | White et al. | 43/21.2 |

FOREIGN PATENT DOCUMENTS 1601116  10/1981  United Kingdom .................. 43/21.2

*Primary Examiner*—Kurt Rowan
*Attorney, Agent, or Firm*—Wall and Roehrig

[57] ABSTRACT

An improved body harness for firmly supporting the butt end of fishing rod while big game fishing in a standing position. The harness comprises a rigid, unitary body member having a central portion adapted to engage the front of the fisherman's thighs and a pair of curved side portions that project from the opposite sides of the central portion so as to extend around the sides of the fisherman's thighs. The harness includes straps for holding it in position on the fisherman and is formed with a centrally located socket for receiving and holding the butt end of a fishing rod.

4 Claims, 2 Drawing Sheets

U.S. Patent  Aug. 22, 1989  Sheet 1 of 2  4,858,364
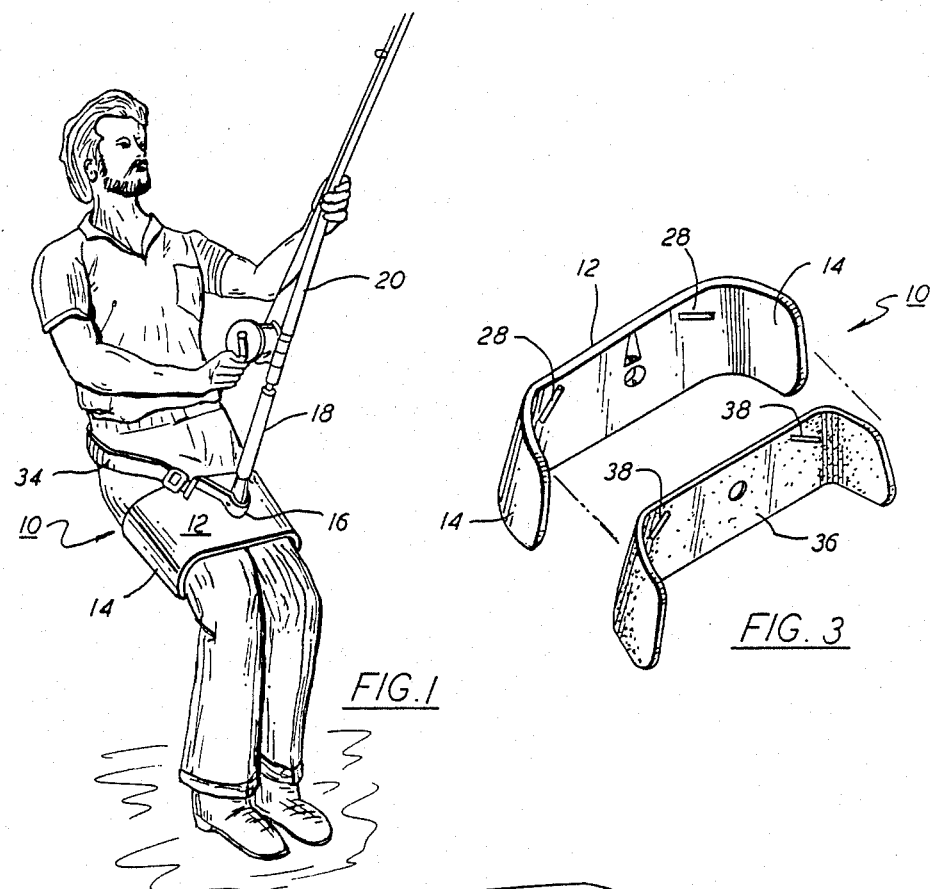
FIG. 1
FIG. 3
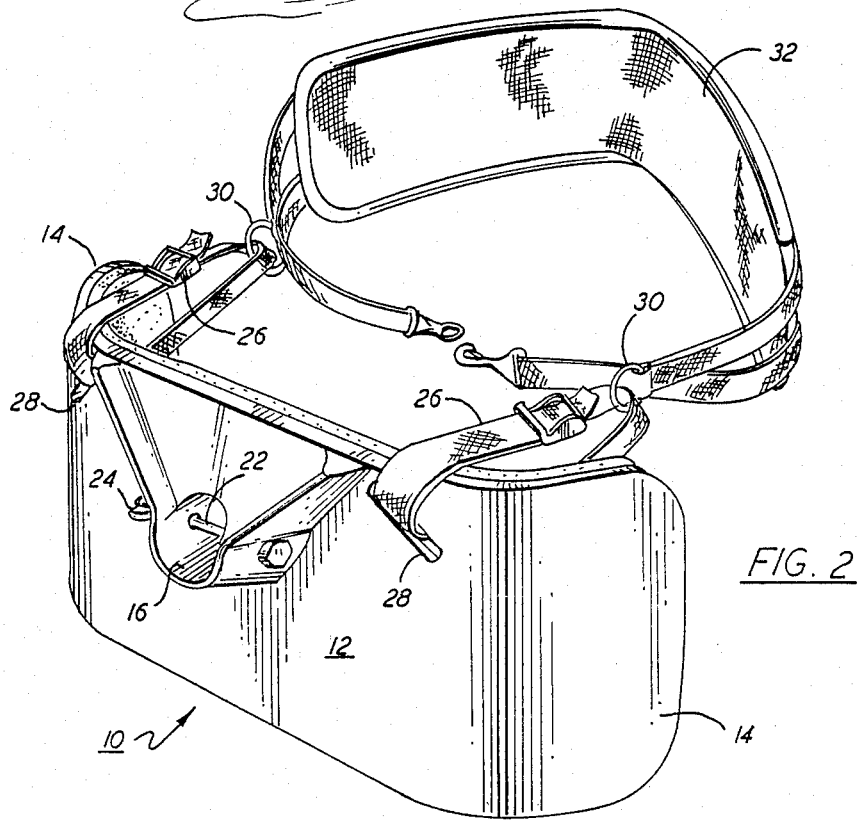
FIG. 2

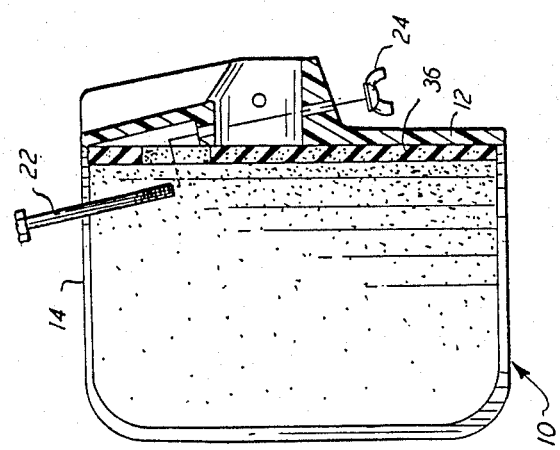
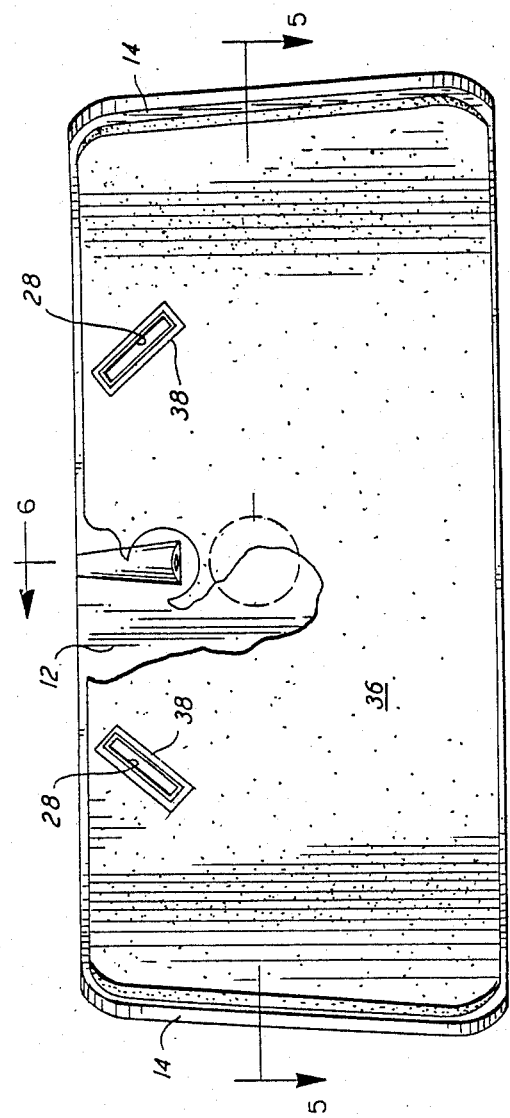
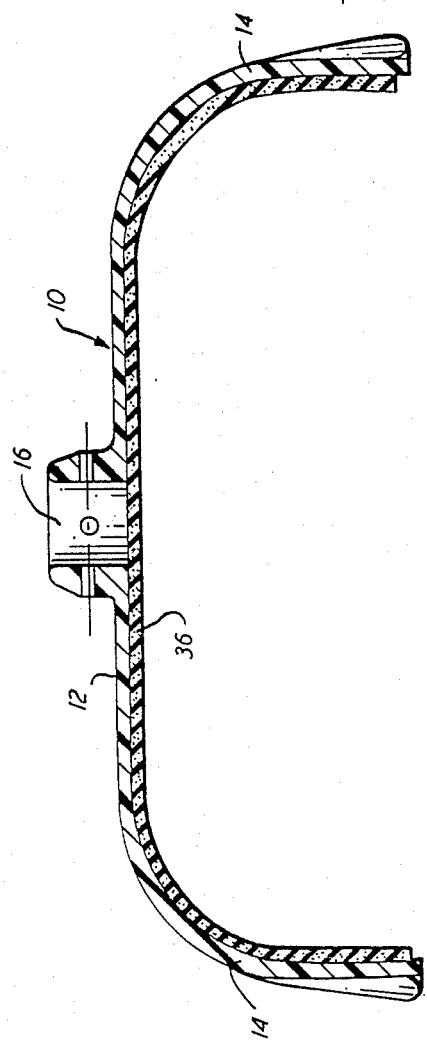

BODY HARNESS FOR SUPPORTING A FISHING ROD

BACKGROUND OF THE INVENTION

This invention relates generally to fishing equipment, and has particular reference to a novel body harness for supporting the butt end of a fishing rod.

In big game fishing in either salt or fresh water, the fisherman traditionally fights the fish from a "fighting" chair that is rigidly secured to the deck of the fishing boat and which is provided with a socket or other means for receiving and holding the butt end of the fishing rod. However, not all boats used for fishing are equipped with fighting chairs which means that the fisherman will usually fight his fish in a standing position, and some fishermen prefer stand-up fishing even when fighting chairs are available.

The problem with stand-up fishing for big game fish is that it is very difficult to hold the rod with one hand and work the reel with the other without the help of the butt end socket that comes with a fighting chair. In an attempt to solve this problem, a rod support has been developed by Braid Products, Ltd. of Woodland Hills, Calif. which is a rigid, molded member having a socket for the butt end of a rod, the member being adapted to engage the fisherman in the thigh area and being held in position by a strap or belt that passes around the fisherman's waist. The Braid rod support is flat and relatively small and has the disadvantage of being able to slip laterally from side to side as the fisherman is fighting his fish. The Braid rod support is the closest prior art known to the applicant; however, a search in the Patent and Trademark Office did not turn up a patent covering same.

SUMMARY OF THE INVENTION

The present invention provides an improved body harness for firmly supporting the butt end of a fishing rod while big game fishing in a standing position. This body harness comprises a rigid, unitary body engaging member having a substantially flat central portion adapted to engage the front of the fisherman's thighs and a pair of curved side portions that respectively project from the opposite sides of the central portion so as to extend around the sides of the fisherman's thighs. The curved side portions merge smoothly with the opposite sides of the central portion and operate to prevent lateral movement of the body harness when in use. The harness includes straps for holding it in position on the fisherman and is formed with a centrally located socket for receiving and holding the butt end of a fishing rod. The body harness is constructed in such a manner that when the fisherman bends at the knees in fighting a fish most of the strain is transmitted to powerful leg muscles rather than the back.

BRIEF DESCRIPTION OF THE DRAWINGS

FIG. 1 is a pictorial illustration of a fisherman using the body harness of the invention;

FIG. 2 is an enlarged perspective view of the body harness together with flexible strap means for holding the harness in position on the fisherman;

FIG. 3 is a exploded, perspective view, on a reduced scale, of the body harness and inner, optional comfort pad;

FIG. 4 is a rear elevation of the body harness with a portion broken away to show a detail of construction;

FIG. 5 is a horizontal sectional view taken on line 5—5 of FIG. 4; and

FIG. 6 is a vertical sectional view taken on line 6—6 of FIG. 4.

DESCRIPTION OF THE PREFERRED EMBODIMENT

Reference is now made to the drawings wherein FIG. 1 shows the body harness, indicated generally at 10, in use by a fisherman fighting a big game fish in a standing position. As shown, the harness has a "wrap-around" configuration so that it engages the sides as well as the front of the fisherman's thighs. To this end, the harness 10 has a substantially flat central portion 12 that overlies the front of the fisherman's thighs and a pair of curved side portions 14 that project from the opposite sides of the central portion so as to extend around the sides of the fisherman's thighs. The harness has a rigid, unitary construction, preferably of plastic, and the side portions 14 merge smoothly with the central portion 12 as shown in the drawings.

Formed integrally with the central portion of the body harness is a socket 16 for receiving and holding the butt end 18 of a rod 20 as shown in FIG. 1. The socket is provided with a gimbal cross-pin 22 which swivelly engages the rod butt end. This pin can be mounted in the socket either horizontally as shown in FIG. 2 or vertically as indicated in FIGS. 4–6, the pin having a removable wing nut 24 at one end to enable the pin to be easily shifted from one position to the other according to the fisherman's preference.

The body harness is held in position on the fisherman by a pair of straps 26 each of which extends between a slot 28 in the harness and a ring 30 that forms a part of a flexible kidney harness 32, FIG. 2. The kidney harness is a well-known, commercially available item and is not per se a part of the present invention. Alternatively, the body harness 10 can be held in position by a single belt or strap 34, FIG. 1, which passes through the slot 28 on one side of the harness, around the fisherman's waist and then to the slot 28 at the other side of the harness.

The body harness of the invention is provided with an optional resilient pad 36, FIG. 3, which conforms to the harness in size and shape as shown. This pad is not fixed to the harness but is meant to be used with the harness and can be glued to the harness for extra comfort if needed.

From the foregoing description it will be apparent that the invention provides an improved body harness for stand-up big game fishing wherein most of the strain is taken by the fisherman's leg muscles rather than his back and wherein the harness is held firmly and comfortably in position with virtually no lateral movement. As will be understood by those familiar with the art, the invention may be embodied in other specific forms without departing from the spirit or essential characteristics thereof.

Although the harness is ideally suited as a stand-up device it can be used equally as well when the wearer is seated in a chair without departing from the teachings of the present invention.

I claim:

1. A body harness for supporting the butt end of a fishing rod comprising a rigid, unitary body engaging member having a substantially flat central portion adapted to engage and extend across the front of the fisherman's thighs and a pair of curved side portions respectively projecting from the opposite sides of the central portion at substantially right angles thereto so as to extend alongside the fisherman's thighs, the side portions merging smoothly with the opposite sides of the central portion, the central portion being formed with a socket for receiving the butt end of the fishing rod, and releasable means for holding the body harness in position on the fisherman.

2. A body harness as defined in claim 1 including a gimbal pin mounted in the socket for engagement with the butt end of a fishing rod.

3. A body harness as defined in claim 2 wherein the socket includes means to permit the gimbal pin to be mounted in either a horizontal or a vertical position.

4. A body harness of as defined in claim 1 together with a resilient cushion member mounted on the inside of the body member.

* * * * *